Jan. 24, 1933. T. D. CURRIE 1,895,281
VISE AND THE LIKE
Filed Jan. 21, 1931
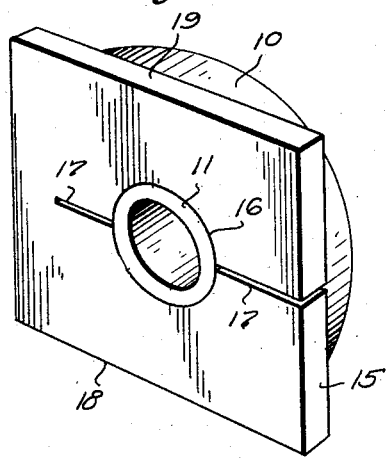
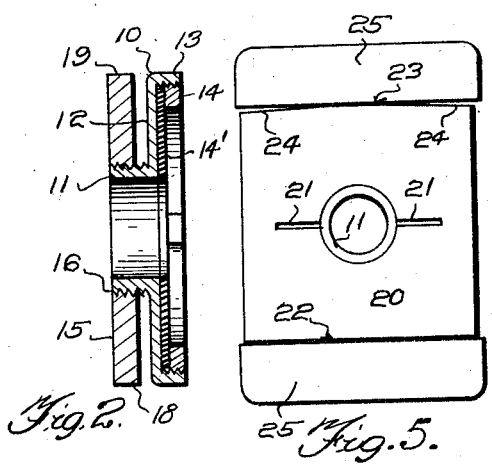
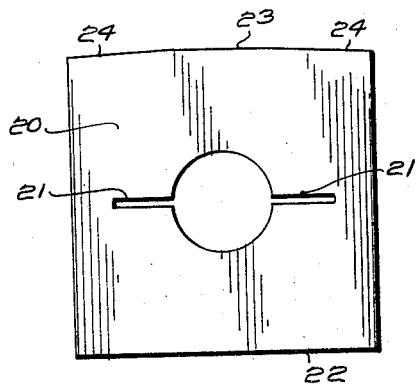
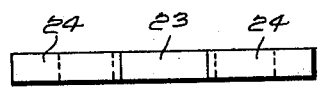
INVENTOR.
Thomas D. Currie,
BY H. S. Woodward,
ATTORNEY.

Patented Jan. 24, 1933

1,895,281

UNITED STATES PATENT OFFICE

THOMAS D. CURRIE, OF DETROIT, MICHIGAN

VISE AND THE LIKE

Application filed January 21, 1931. Serial No. 510,264.

The invention relates to vises, clamps and the like, suitable for holding round work, and particularly adapted to use upon threaded tubes which have to be gripped on the threaded portion.

It is an important aim of the invention to produce a device adapted for engagement with work in such a manner that liability of damage to the work by permanent strain is avoided. It is an object especially to present means whereby the ordinary workman may secure safely in a vise a piece of round work having a low elastic index, and which can be readily distorted so as to impair its utility. The ordinary workman with appliances heretofore available secures round work in a vise very often by securing it between flat jaws, but in some instances may use a special form of jaw to receive and grip the work. In such cases the workman must tighten the vise until the work is gripped with sufficient security, and he gauges the critical stress of the work before failure and permanent distortion by his experience in observing the qualities and characteristics of such materials. He will often err in this estimate. And at other times he will err in the utilization of the vise—applying more force than he realizes, or applying it in such a way in relation to the contours and proportions of the work that damage is done before he appreciates the peculiar susceptibility of the work. It is therefore an aim of this invention to provide a device in which such work may be gripped safely without exceeding the critical strain thereof beyond which it will become permanently deformed so as to render it unserviceable.

It is an aim to present the invention in forms adapted to use in bench or other vises, or in hand tools for gripping such work, to the end that the workman may operate the tools in accordance with familiar practice and manipulation, but will not be able to apply force to the work beyond that predetermined as safe for its effective clamping.

A further purpose of the invention is to offer a novel specific construction in the appliance for attaining the ends in view. These and other objects, advantages and features of invention are comprised, some of which will be understood from the following description and accompanying drawing, while others are particularly set forth.

Figure 1 of the drawing is an isometric perspective view of my invention in one form, with a valve shank engaged therein.

Figure 2 is a cross section on the symmetrical axis of Figure 1.

Figure 3 is a plan of a modified clamp block.

Figure 4 is an edge view of the device of Figure 3.

Figure 5 is a top view of a vise having one form of the invention engaged therein and the work held thereby before tightening of the vise.

There is illustrated in Figures 1 and 2 a valve disc 10, which includes the exteriorly threaded tubular shank 11 and an integral disc portion proper 12 in a plane at right angles to the axis of the shank. The disc is formed with a peripheral cylindrical interiorly threaded flange or wall 13 and is constructed to have secured therein the insert 14' held by an exteriorly threaded collar 14 screwed into the wall 13. The tool may be used on various other work. A block 15 of resilient suitably tempered metal is shown, which is nearly rectangular. This valve body and collar are ordinarily formed of brass, and the insert of rubber. It has a central threaded opening 16 of a size to permit the shank 11 to be screwed snugly thereinto, the block being of a thickness to engage over a suitable longitudinal extent of the shank.

This block is formed with a slit 17 extending symmetrically across the block parallel to one side from near one edge to the opening 16 and being continued at the far side of the opening through the opposite edge of the block. This slit is in a plane at right angles to the major plane of the block and diametrical with respect to the opening 16. Furthermore, the suit is of a width in the clear corresponding to the critical extent of strain permissable in the work, and when the block has been compressed upon the work so as to close the slit at the open end, distortion of the work will be short of the critical stress and strain thereof.

In addition, the block is varied from parallelism in its two sides 18 and 19, which are laterally of the slit, the block being narrower toward the closed end of the slit, so that when the sides 18 and 19 are compressed between the jaws of a vise until the open end of the slit is closed, the sides 18 and 19 will be substantially parallel, and further closing movement of the vise prevented. The clearance in the slit 17 for a ¾ inch brass pipe element, threaded, is approximately five-one-thousandths (.005) of an inch, and that is the degree of variance of the sides 18 and 19 of the block from parallelism, as indicated.

In Figures 3 and 4 the invention is embodied in a block 20 of similar material for a similar use, but in this instance the slit 21 stops short of the outer edges of the block on both sides of the opening 16, and the block is formed with one side 22 parallel to the slit throughout, while the opposite side is formed with a central portion 23 parallel to the side 22 and beveled or inclined portions 24 adjacent the corners of the block and overlying the slit ends.

In the use of the last described form of the device, the block 20 has its sides 22 and 23 gripped initially between the jaws of a vise while the work is engaged in the opening 16, and then upon tightening of the vise, the block is deformed so as to permit the central portion adjacent the edge 23 to be pressed inward toward the work until the outer inclined faces 24 are encountered by the vise jaws, when further compression of the block is checked while the work is safely gripped by the sides of the opening 16.

It is of course not essential that the opening 16 be threaded if smooth round work is to be held, and many variations of the construction within the scope of the appended claims may be made as discretion dictates to adapt the invention to any use involved.

In Figure 5 one of the blocks previously described is shown engaged between the jaws 25 of a vise, the clearance indicated between the sides of one jaw and the inclined faces of the block being exaggerated for the purpose of illustration.

It should be appreciated that the portions of the block 15 and the block 20 which are not slitted may be termed non-compressible portions, in view of the fact that they are relatively so resistant to compression as to ordinarily prevent compression of the other side of the block beyond the predetermined limits.

I claim:—

A clamping but compression limiting device comprising a block having a work receiving aperture and slits radiating from said aperture to allow compressibility to the extent of the width of said slits but limiting the compressibility to this range, said block having opposite outer walls to engage the jaws of a vise, press or the like, of such contour that the pressure of such jaws is first concentrated on the walls of the opening and slits and gradually distributed throughout the said opposite walls as the compression reaches the limit afforded by the slits.

In testimony whereof I affix my signature.

THOMAS D. CURRIE.